(12) United States Patent
Kimoto et al.

(10) Patent No.: US 6,460,516 B2
(45) Date of Patent: Oct. 8, 2002

(54) CANISTER FOR VEHICLE

(75) Inventors: Junya Kimoto; Tomonari Toki; Hideo Yamada, all of Ohbu (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/905,976

(22) Filed: Jul. 17, 2001

(65) Prior Publication Data

US 2002/0020398 A1 Feb. 21, 2002

(30) Foreign Application Priority Data

Jul. 18, 2000 (JP) ........................................ 2000-217089

(51) Int. Cl.[7] ............................................. F02M 33/02
(52) U.S. Cl. .................................. 123/519; 123/198 D
(58) Field of Search .............................. 123/516, 518, 123/519, 520, 521, 198 D (56) References Cited

U.S. PATENT DOCUMENTS

| | | | |
|---|---|---|---|
| 4,306,894 A | * 12/1981 | Fukami et al. ................ | 96/131 |
| 5,207,808 A | * 5/1993 | Haruta et al. ................ | 96/131 |
| 5,337,721 A | * 8/1994 | Kasuya et al. ............... | 123/519 |
| 5,564,398 A | * 10/1996 | Maeda et al. ................ | 123/520 |
| 5,647,332 A | * 7/1997 | Hyodo et al. ................ | 123/519 |
| 5,875,765 A | * 3/1999 | Norton ........................ | 123/520 |

FOREIGN PATENT DOCUMENTS

| | | |
|---|---|---|
| JP | 61-97566 | 6/1986 |
| JP | 11-200963 | 7/1999 |

* cited by examiner

*Primary Examiner*—Carl S. Miller
(74) *Attorney, Agent, or Firm*—Stevens, Davis, Miller & Mosher, LLP (57) ABSTRACT

In a canister for a vehicle, in order to significantly reduce a leaking amount of evaporated fuel from an atmospheric port of the canister, an introduction port for evaporated fuel and an atmospheric air port for the evaporated fuel are provided in a casing, and an adsorbing material layer communicates between the introduction port and the atmospheric air port. A chamber is provided between the atmospheric air port and a surface on a side of the atmospheric air port in the adsorbing material layer. A leakage preventing adsorbing material layer is arranged within the chamber so that a space layer is formed between the leakage preventing adsorbing material layer and the surface on the atmospheric air port side in the adsorbing material layer and another space layer is formed between the leakage preventing adsorbing material layer and the atmospheric air port.

2 Claims, 9 Drawing Sheets

FIG. 9 ic_air through the atmospheric air port 110 and the
CANISTER FOR VEHICLE

FIELD OF THE INVENTION

The present invention relates to a canister for a vehicle, and more particularly to a canister serving as evaporated fuel adsorbing means used for treating evaporated fuel from a fuel system in an internal combustion engine mounted on a vehicle.

DESCRIPTION OF THE PRIOR ART

Figure 7:
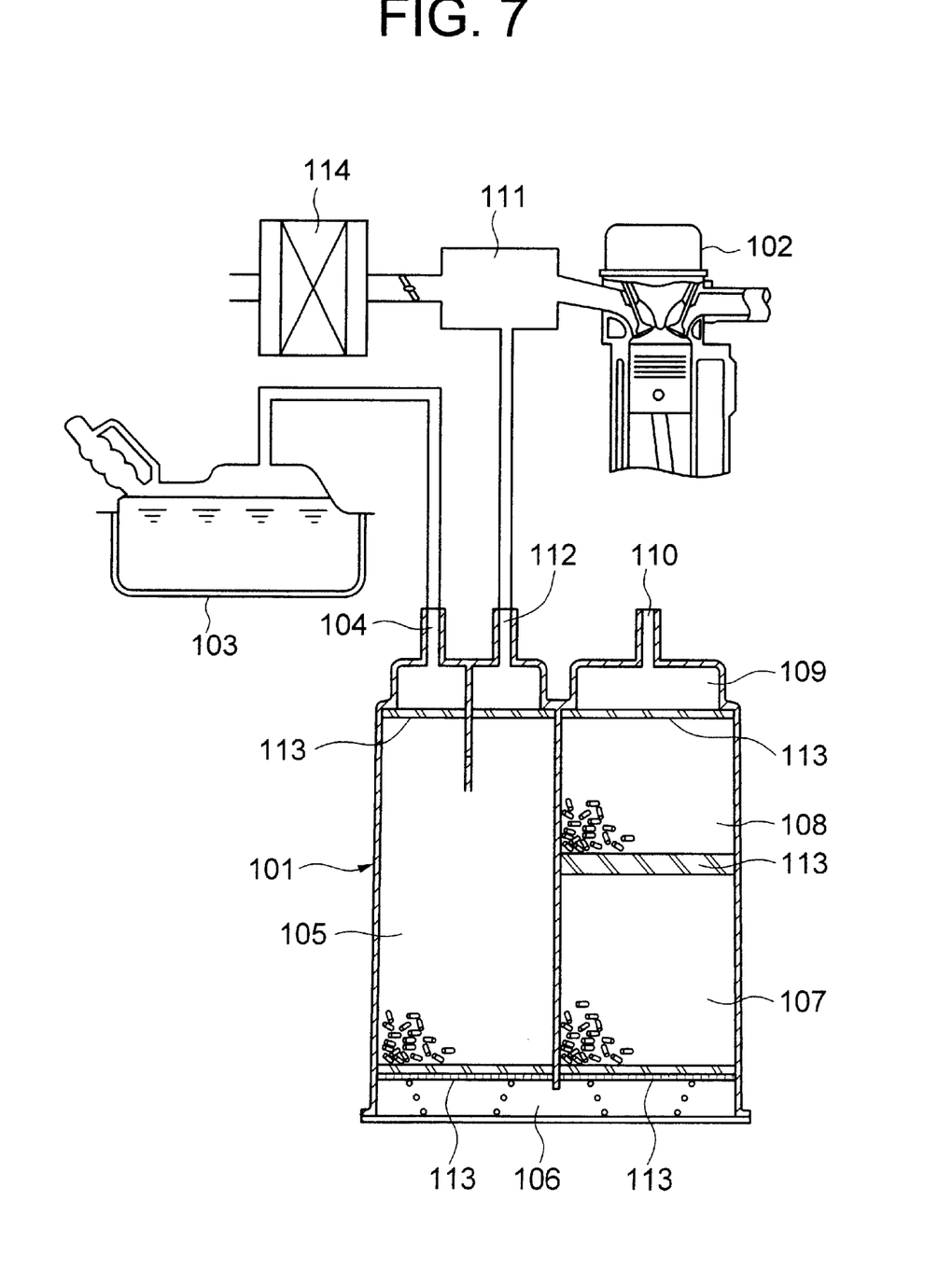
FIG. 7 is a schematic view showing an evaporated fuel treating apparatus employing a conventional canister for a vehicle.

In conventional, in the vehicle, there has been employed an evaporated fuel treating apparatus for preventing evaporated fuel from a fuel system such as a fuel tank or the like from being discharged to an atmospheric air, and a structure shown in FIG. 7 has been, for example, known as means for adsorbing and collecting the evaporated fuel.

A canister 101 shown in FIG. 7 is structured such as to introduce an evaporated fuel generated within a fuel tank 103 from an introduction port 104 so as to flow through a first adsorbing material layer 105 constituted by adsorbent such as activated carbon or the like, a communicating chamber 106, a second adsorbing material layer 107 and a third adsorbing material layer 108, adsorb and collect the evaporated fuel to each of the adsorbing material layers 105, 107 and 108 and discharge air from an atmospheric air port 110 through a chamber 109 at a time when an engine 102 stops, and, at a time when the engine 102 is operated, such as to apply a negative pressure generated in an intake manifold 111 to a purge port 112 of the canister 101 so as to purge the evaporated fuel adsorbed and collected to each of the adsorbing material layers 105, 107 and 108 to the engine 102 from the purge port 112. In the drawing, reference numeral 113 denotes a filter and reference numeral 114 denotes an air cleaner.

Figure 8:
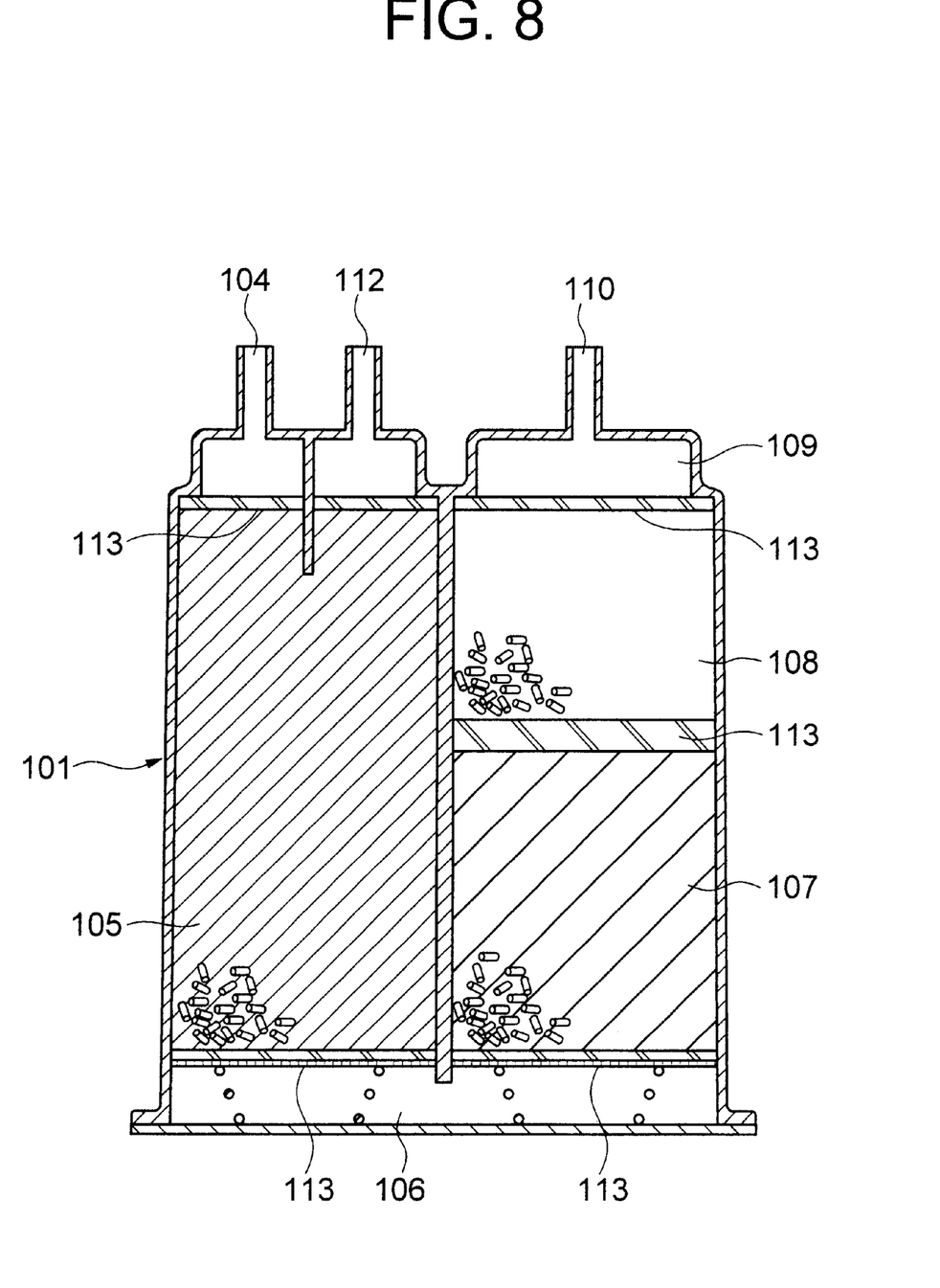
FIG. 8 is a vertical cross sectional view showing the conventional canister for the vehicle in FIG. 7, which shows an adsorbing concentration state of the evaporated fuel immediately after an engine stops.

In the conventional canister, when the engine 102 stops, the evaporated fuel is adsorbed to each of the adsorbing material layers 105, 107 and 108 in the canister 101, however, an adsorbing state immediately after the engine stops corresponds to a state, as shown in FIG. 8, that concentration of adsorption is high in the first adsorbing material layer 105, concentration of adsorption is middle in the second adsorbing material layer 107 and concentration of adsorption is low in the third adsorbing material layer 108. In this case, in the first adsorbing material layer 105 and the second adsorbing material layer 107 in FIG. 8, the adsorbing material layer having high concentration is expressed by a narrowly hatched portion.

Figure 9:
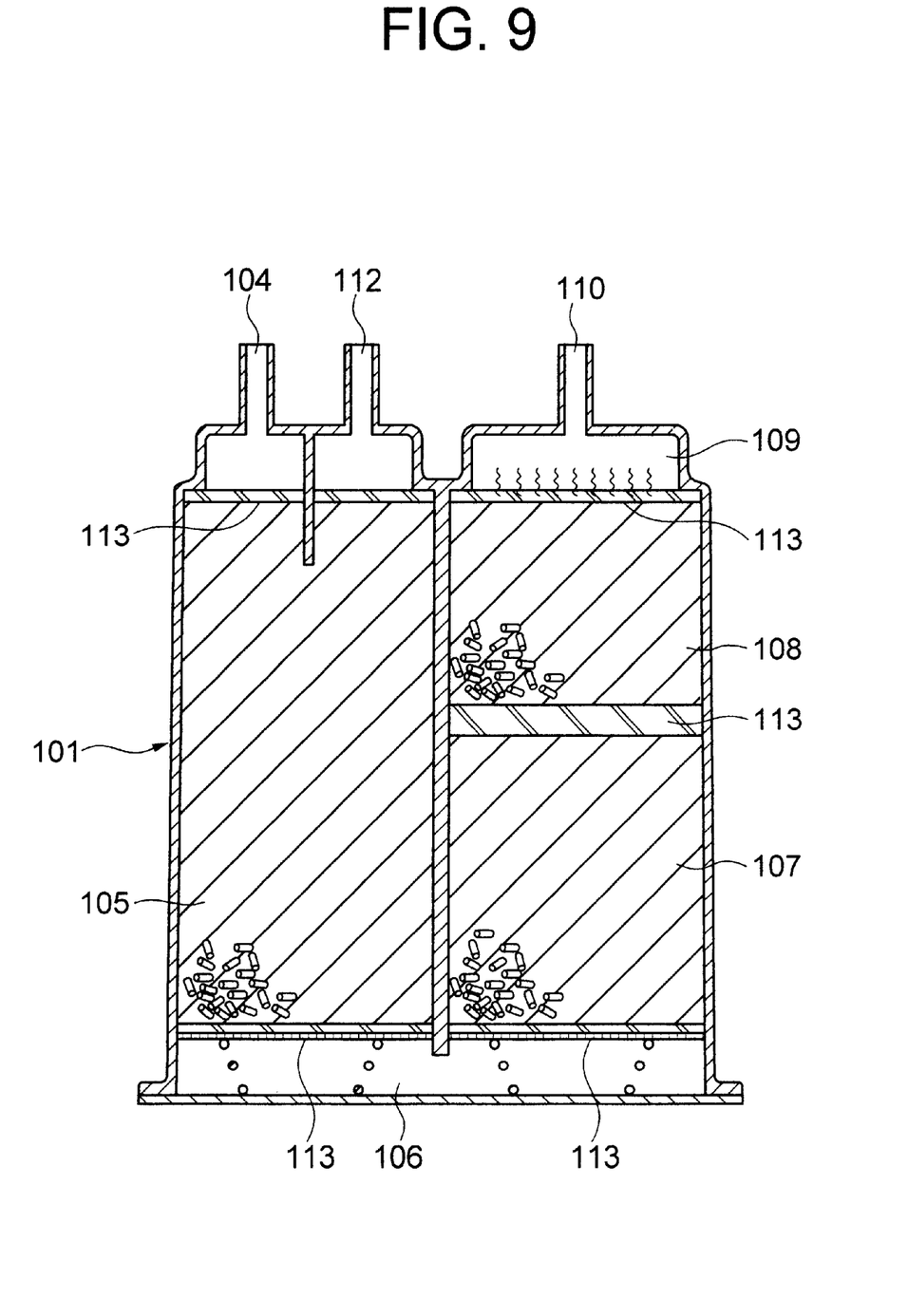
FIG. 9 is a vertical cross sectional view showing a state that the evaporated fuel is diffused after a time has further passed from the state shown in FIG. 8.

Then, since the evaporated fuel adsorbed to each of the adsorbing material layers 105, 107 and 108 tends to uniformly diffuse to a whole together with passage of time after the engine stops, the concentration of the evaporated fuel within the third adsorbing material layer 108 becomes gradually higher as shown in FIG. 9, so that all of the adsorbing material layers 105, 107 and 108 have the substantially uniform concentration. In FIG. 9, intervals between the hatched lines expressed within the respective adsorbing material layers 105, 107 and 108 are set to the same interval, thereby showing a uniform concentration state. When the concentration of the third adsorbing material layer 108 becomes high as mentioned above, a little amount of evaporated fuel adsorbed to the third adsorbing material layer 108 may leak to the chamber 109 even if the adsorbing material layer 108 can yet adsorb some evaporated fuel, so that there is a risk that the evaporated fuel leaks to the atmospheric air through the atmospheric air port 110 and the canister dose not have an ability to adsorb and collect the sufficient evaporated fuel.

SUMMARY OF THE INVENTION

An object of the present invention is to provide a canister for a vehicle which can further reduce a leakage of an evaporated fuel to an atmospheric air and can sufficiently adsorb and collect the evaporated fuel.

In order to solve the problem mentioned above, in accordance with the present invention, there is provided a canister for a vehicle comprising:

an introduction port for an evaporated fuel provided in a casing;

an atmospheric air port for the evaporated fuel provided in the casing; and an adsorbing material layer communicating between the introduction port and the atmospheric air port, wherein a chamber is provided between the atmospheric air port and a surface on a side of the atmospheric air port in the adsorbing material layer, and a leakage preventing adsorbing material layer is arranged within the chamber so that a space layer is formed between the leakage preventing adsorbing material layer and the surface on the side of the atmospheric air port in the adsorbing material layer and another space layer is formed between the leakage preventing adsorbing material layer and the atmospheric air port.

In accordance with the present invention, when the engine stops, the evaporated fuel generated from an evaporated fuel generating source is adsorbed and collected to the adsorbent in the adsorbing material layer within the canister from the introduction port. At this time, immediately after the engine stops, the closer to the introduction port a part in the adsorbing material layer within the canister is, the higher concentration of adsorption is. However, in correspondence to passage of time after the engine stops, the evaporated fuel diffuses to a whole of the adsorbing material layers within the canister and leaks out from the surface on the side of the atmospheric air port in the adsorbing material layer only at a little amount.

At this time, since the space layer is provided between the surface on the side of the atmospheric air port in the adsorbing material layer and the leakage preventing adsorbing material layer, the leakage of the evaporated fuel can be restricted by this space layer.

Further, it is possible to adsorb and collect and the evaporated fuel leaking within the space layer by providing the leakage preventing adsorbing material layer.

Accordingly, it is possible to significantly reduce an amount of the evaporated fuel within the adsorbing material layers which is discharged to the atmospheric air through the atmospheric air port.

Further, in accordance with the present invention, the leakage preventing adsorbing material layer may be formed by a filter including adsorbent to which an adsorbent is penetrated.

In accordance with this structure, since an amount of the evaporated fuel leaking from the surface on the side of the atmospheric air port in the adsorbing material layer is a little as mentioned above, an amount of the leakage preventing adsorbent required for adsorbing the leaking evaporated fuel can be reduced. Accordingly, as well as the function can be sufficiently achieved by the leakage preventing adsorbent penetrating into the filter in the manner mentioned above, the leakage preventing adsorbing material layer can be constituted only by placing the filter into which the leakage preventing adsorbent penetrates, so that a structure for assembling the leakage preventing adsorbent becomes simple and an operation for assembling becomes significantly easily performed.

DESCRIPTION OF THE PREFERRED EMBODIMENTS

A description will be given in further detail of an embodiment in accordance with the present invention with reference to FIGS. 1 to 3.

Figure 1:
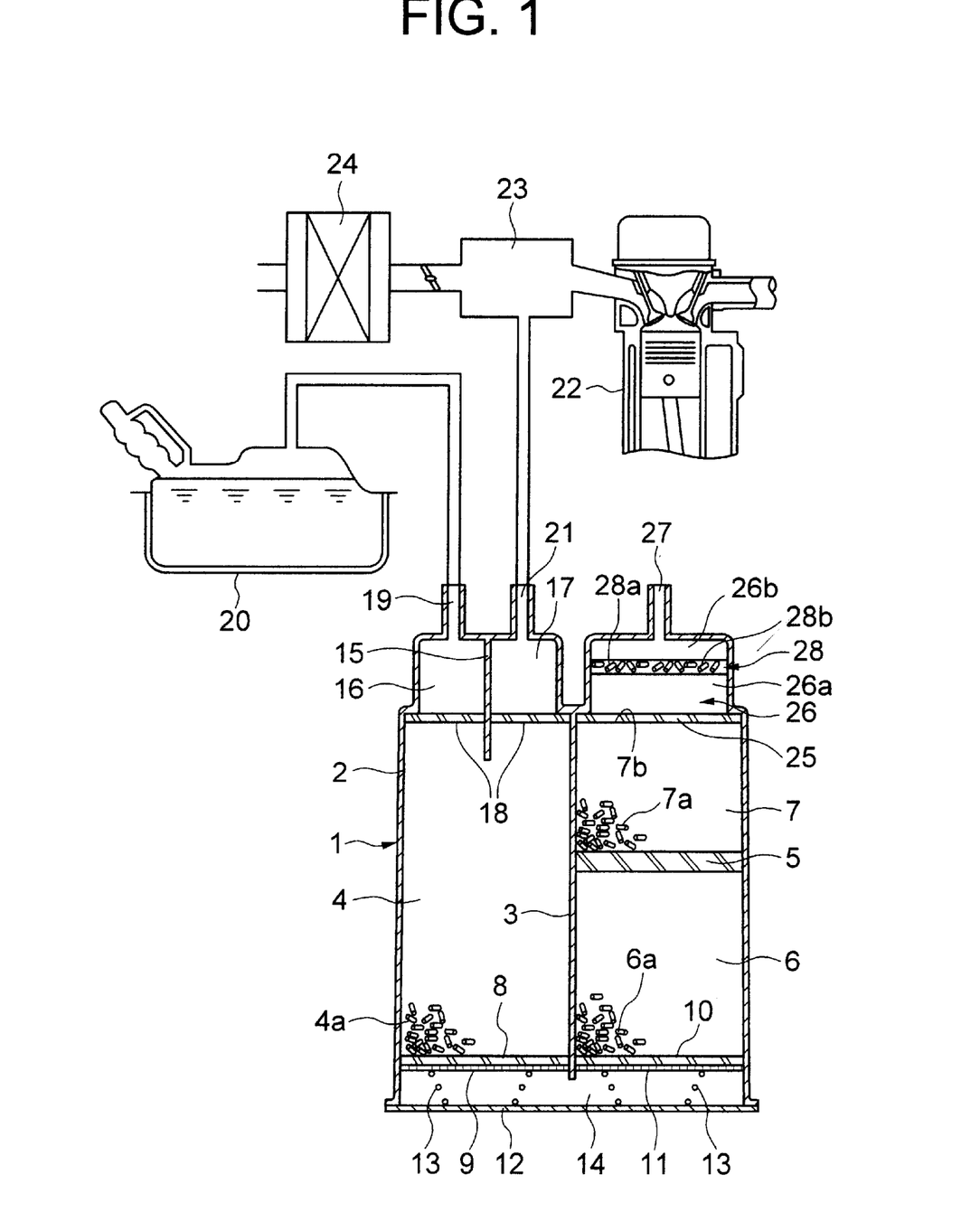
FIG. 1 is a schematic view showing an evaporated fuel treating apparatus employing a first embodiment of a canister for a vehicle in accordance with the present invention.

FIG. 1 shows an embodiment of an evaporated fuel treating apparatus employing a canister for a vehicle in accordance with the present invention. A first adsorbing material layer 4 having adsorbent 4a charged therein is provided in one chamber sectioned and formed by a partition wall 3 within a casing 2 of a caster 1, a filter 5 is provided in a middle of another chamber within the casing 2, a second adsorbing material layer 6 having adsorbent 6a charged therein is provided in a lower chamber beneath the filter 5, and a third adsorbing material layer 7 having adsorbent 7a charged therein is provided in an upper chamber above the filter 5.

The first adsorbing material layer 4 is supported on a lower surface by a filter 8 and a porous plate 9, and the second adsorbing material layer 6 is supported on a lower surface by a filter 10 and a porous plate 11. Further, a spring 13 is interposed between both of the porous plates 9 and 11 and a bottom plate 12, whereby a communicating chamber 14 is formed, so that the lower surface of the first adsorbing material layer 4 and the lower surface of the adsorbing material layer 6 are communicated with each other through the communicating chamber 14.

An introduction chamber 16 and a purge chamber 17 which are sectioned by a partition plate 15 are formed above the first adsorbing material layer 4, and a lower end of the partition plate 15 is inserted to an upper portion of the first adsorbing material layer 4. Further, an upper surface of the first adsorbing material layer 4 is held by a filter 18.

An introduction port 19 for the evaporated fuel is formed on the introduction chamber 16 so as to be communicated therewith, and the introduction port 19 is communicated with an evaporated fuel generating source. In an embodiment shown in FIG. 1, the introduction port 19 is communicated with a gas phase portion of a fuel tank 20.

A purge port 21 is formed on the purge chamber 17 so as to be communicated therewith, and the purge port 21 is communicated with an intake manifold 23 of an engine 22. The intake manifold 23 is communicated with an air cleaner 24.

In the canister 1 mentioned above, the third adsorbing material layer 7 serving as an adsorbing material layer on the most downstream side at a time of introducing the evaporated fuel is held on an upper surface by a filter 25, and a chamber 26 is formed above the filter 25, that is, on an opposite side to the third adsorbing material layer 7 with respect to the filter 25. An atmospheric air port 27 open to an atmospheric air is formed on the chamber 26 so as to be communicated therewith.

A filter 28 including adsorbent, which is positioned in a middle portion between a surface 7b close to the atmospheric air port in the third adsorbing material layer 7 and the atmospheric air port 27 to section and form a space layer 26a on a side of the third adsorbing material layer 7 and a space layer 26b on a side of the atmospheric air port 27, is provided within the chamber 26, whereby a leakage preventing adsorbing material layer 28b is provided in the filter 28 including the adsorbent. The filter 28 including the adsorbent is formed by penetrating adsorbent 28a during manufacturing a nonwoven fabric having air permeability, an urethane foam or the like and integrally holding it by adhesive or the like so as to have air permeability and a dustproof property and adsorb and collect the evaporated fuel by the adsorbent 28a. Further, activated carbon or the like is employed for the adsorbent 28a.

Further, since an amount of the evaporated fuel evaporated (discharged) on the side of the atmospheric air port 27 from the third adsorbing material layer 7 is a little, it is sufficient that an amount of the adsorbent 28a penetrated to the filter 28 including the adsorbent is smaller than an amount of the adsorbent 7a in the third adsorbing material layer 7, so that a capacity of the filter 28 including the adsorbent can be about one tenth of the amount of the adsorbent 7a in the third adsorbing material layer 7. As a result of experiment, a good effect was obtained at a used amount 2.5 g of the adsorbent 28a in the filter 28 including the adsorbent. As mentioned above, since the used amount of the adsorbent 28a can be reduced, the structure can be made such that a necessary amount of adsorbent is penetrated to a thin-plate filter and the thin-plate filter is arranged at a predetermined position, so that a structure for assembling the adsorbent becomes simple and an assembling operation becomes significantly easily performed, in comparison with, for example, a structure in which independent adsorbent is arranged between two filters in a manner to form a sandwich shape.

Next, a description will be given of an operation of the embodiment mentioned above.

When the engine 22 stops, the evaporated fuel from the fuel evaporation source, for example, the fuel tank 20 is introduced within the first adsorbing material layer 4 from the introduction port 19 of the canister 1 through the introduction chamber 16 and the filter 18 and adsorbed and collected to the adsorbent 4a in the first adsorbing material layer 4. Further, the evaporated fuel flowing within the first adsorbing material layer 4 flows into the second adsorbing material layer 6 through the filter 8, the porous plate 9, the communicating chamber 14, the porous plate 11 and the filter 10 so as to be adsorbed and collected to the adsorbent 6a in the second adsorbing material layer 6, and further flows into the third adsorbing material layer 7 so as to be adsorbed and collected to the adsorbent 7a thereof.

Further, when the engine 22 is operated, the negative pressure of the intake manifold 23 acts on the purge port 21, and the evaporated fuel adsorbed and collected to each of the adsorbing material layers 4, 6 and 7 is sucked into the purge chamber 17 due to the negative pressure and an inflow of the atmospheric air from the atmospheric air port 27 so as to be purged to the engine 22 from the purge port 21 via the intake manifold 23.

Figure 2:
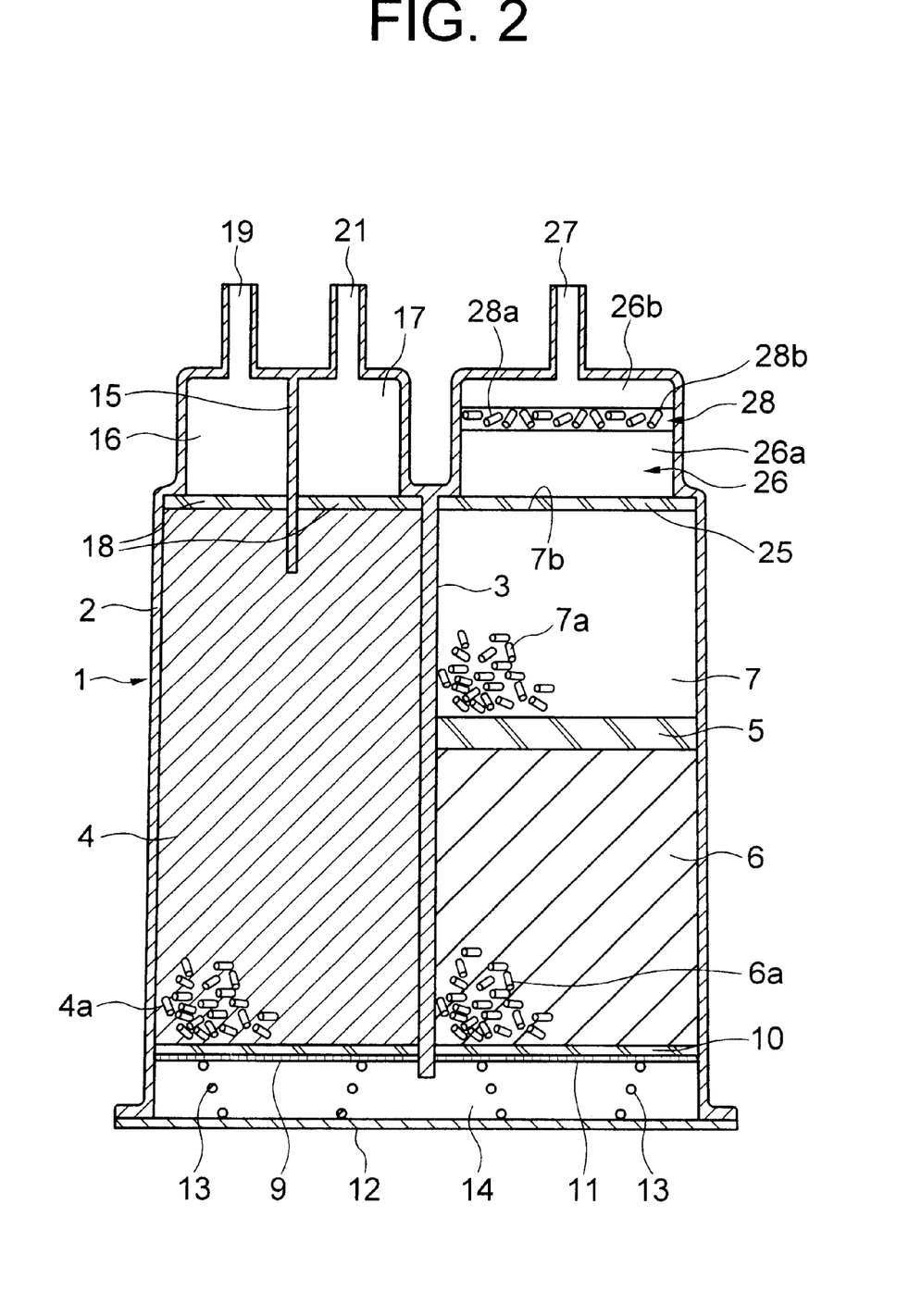
FIG. 2 is a vertical cross sectional view showing the canister for the vehicle of the embodiment shown in FIG. 1 in accordance with the present invention, which shows an adsorbing concentration state of the evaporated fuel immediately after an engine stops.

Further, the adsorption state immediately after the engine stops becomes a state that concentration of adsorption is high in the first adsorbing material layer 4, concentration of adsorption is middle in the second adsorbing material layer 6 and concentration of adsorption is low in the third adsorbing material layer 7, as shown in FIG. 2.

Figure 3:
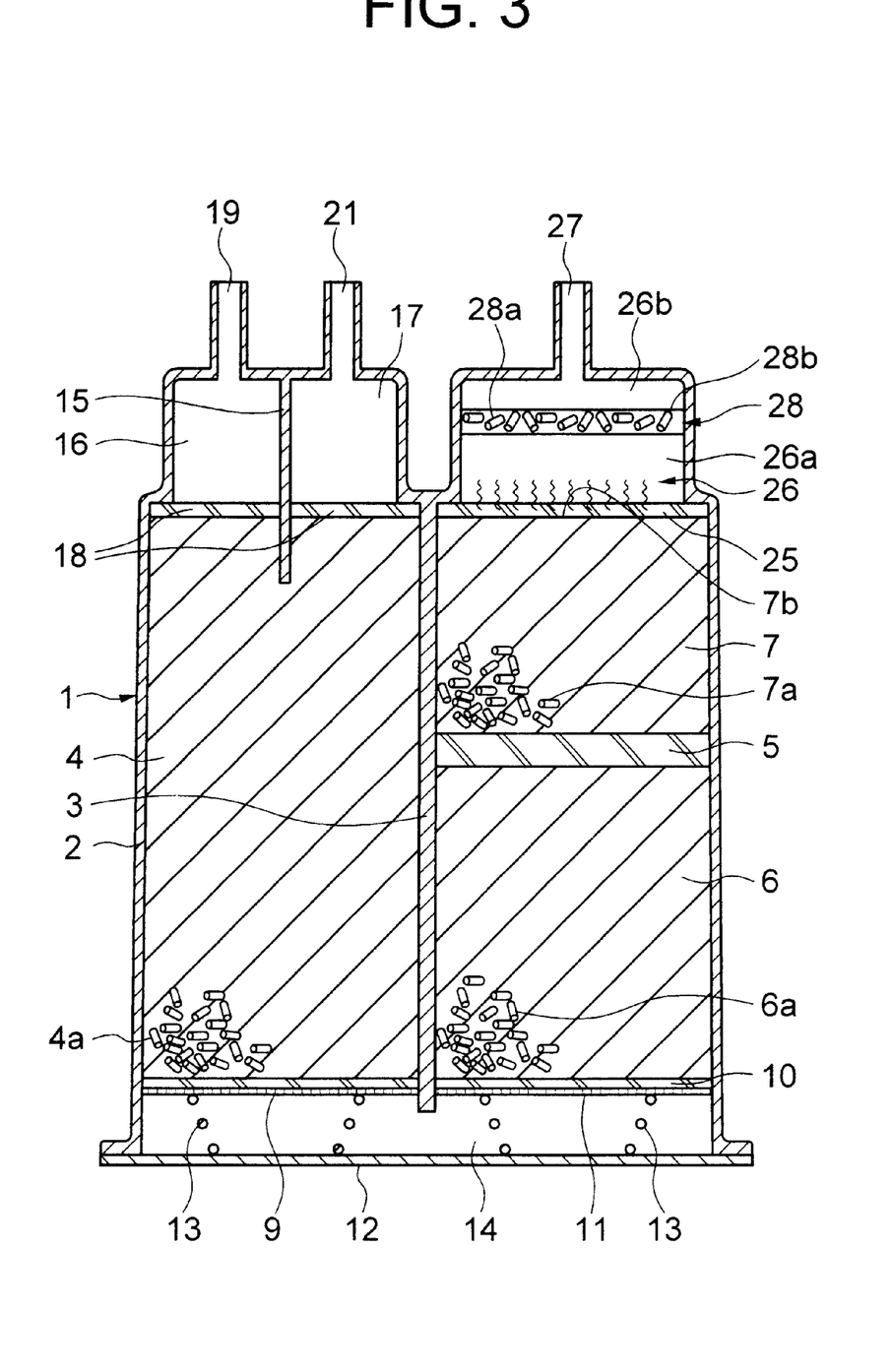
FIG. 3 is a vertical cross sectional view showing a state that the evaporated fuel is diffused after a time has further passed from the state shown in FIG. 2.

Further, since the evaporated fuel adsorbed to each of the adsorbing material layers 4, 6 and 7 tends to be uniformly diffused to a whole together with passage of time after the engine stops, the concentration of the evaporated fuel within the adsorbing material layer 7 becomes gradually higher as shown in FIG. 3. Accordingly, even if the adsorbent 7a in the third adsorbing material layer 7 can yet adsorb the evaporated fuel, a little amount of the evaporated fuel adsorbed to the third adsorbing material layer 7 is going to leak to the chamber 26.

At this time, the space layer 26a in the chamber 26 delays the leakage of the evaporated fuel in the third adsorbing material layer 7 caused by the diffusion, and the leaking evaporated fuel is adsorbed and collected to the adsorbent 28a in the leakage preventing adsorbing material layer 28b. Accordingly, it is possible to significantly reduce an outflow amount of the evaporated fuel to the atmospheric air from the atmospheric air port 27.

Further, since the amount of the evaporated fuel leaking from the third adsorbing material layer 7 is a little, it is possible to sufficiently prevent the evaporated fuel from flowing out to the atmospheric air by a small amount of adsorbent 28a penetrated into the filter 28 including the adsorbent as mentioned above.

Figure 4:
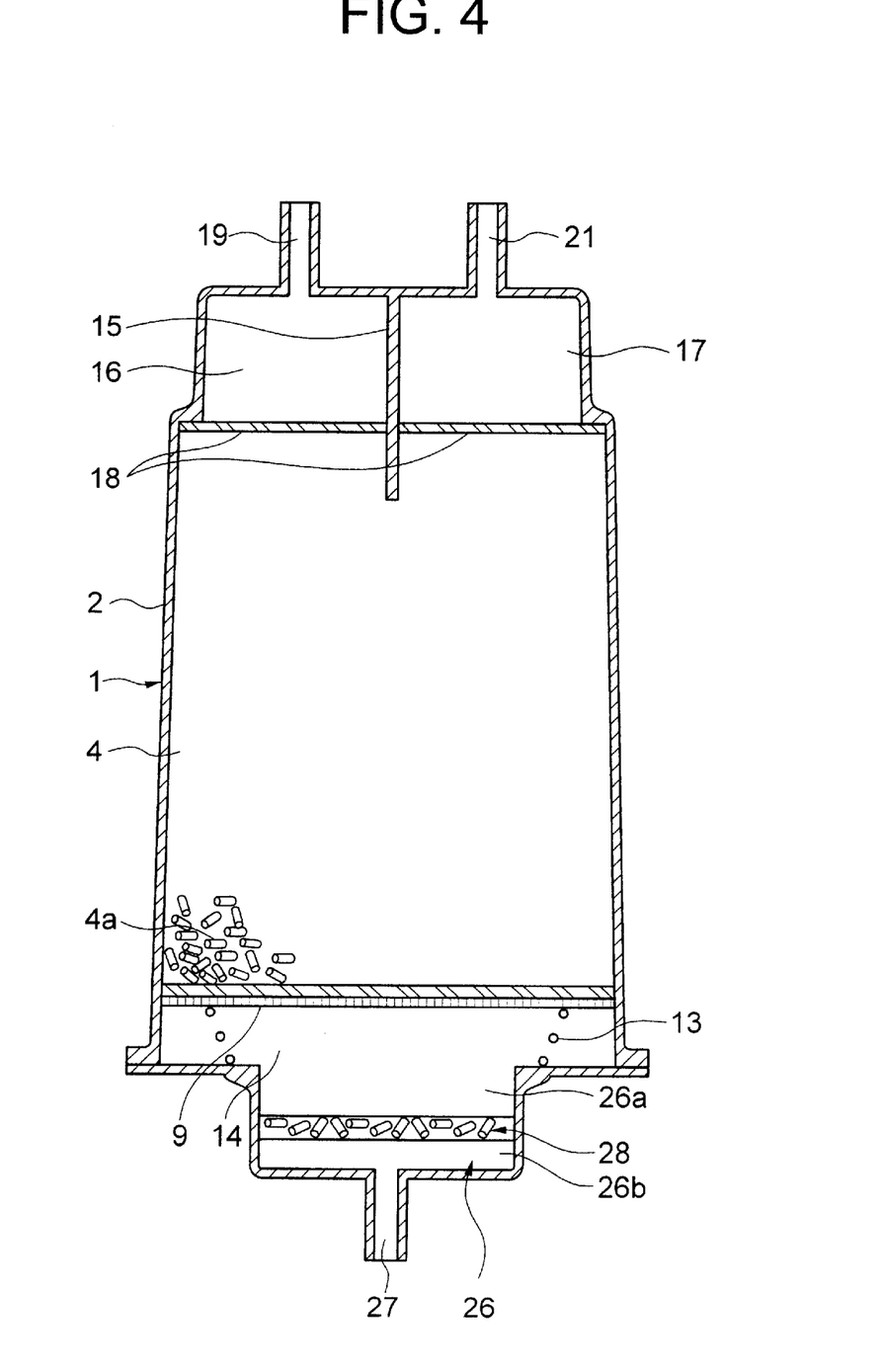
FIG. 4 is a vertical cross sectional view showing a modified embodiment of the first embodiment in accordance with the present invention, which shows a canister in which one adsorbing material layer is provided within a casing 2.
Figure 5:
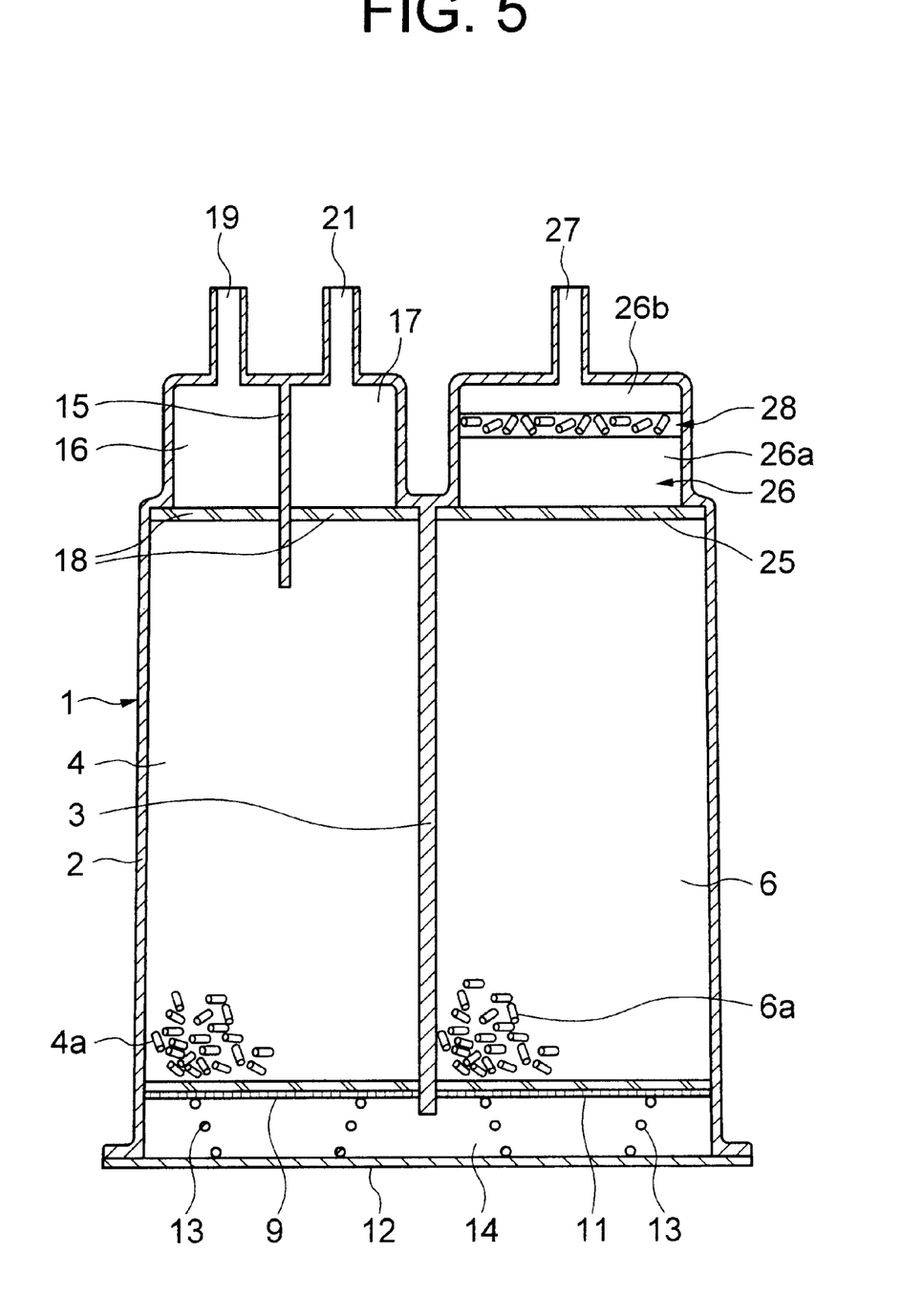
FIG. 5 is a vertical cross sectional view showing another modified embodiment of the first embodiment in accordance with the present invention, which shows a canister in which two adsorbing material layers are provided within the casing 2.

In this case, the embodiment mentioned above is structured such that the present invention is applied to the canister in which three adsorbing material layers are provided in series, however, even in the canister in which one adsorbing material layer is provided as shown in FIG. 4, the canister in which two adsorbing material layers are provided as shown in FIG. 5, or the canister in which a plurality of adsorbing material layers are provided, the structure may be made such that the filter 28 including the adsorbent is provided between the adsorbing material layer on the most downstream side at a time of introducing the evaporated fuel and the atmospheric air port, and the space layers 26a and 26b are provided in both sides.

Figure 6:
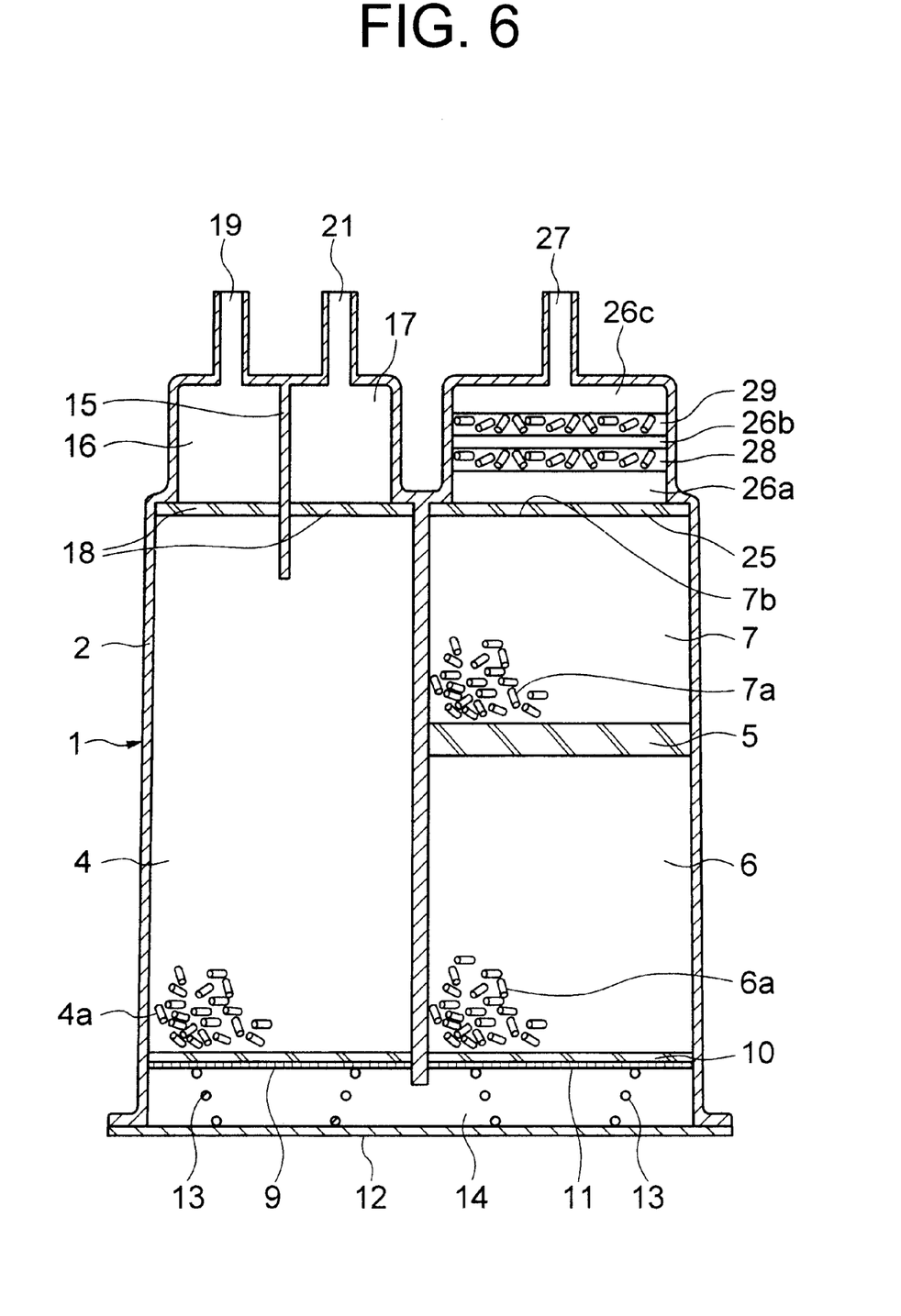
FIG. 6 is a vertical cross sectional view showing a second embodiment in accordance with the present invention, which shows a canister in which there are arranged two filters including the adsorbent which are the same kind of the filter employed in the first embodiment.

Further, the embodiment mentioned above may be, as shown in FIG. 6, such that two filters 28 and 29 including the adsorbents are provided between the adsorbing material layer on the most downstream side at a time of introducing the evaporated fuel and the atmospheric air port, and the space layers 26a, 26b and 26c are provided on respective both sides.

As mentioned above, in accordance with the present invention, it is possible to significantly reduce the leaking amount of the evaporated fuel from the atmospheric air port in the canister so as to prevent an air pollution.

Further, by forming the leakage preventing adsorbing material layer by the filter including the adsorbent to which the adsorbent is penetrated, it is possible to make the structure for assembling the leakage preventing adsorbing material layer simple and it is possible to significantly easily perform the assembling operation.

What is claimed is:

1. A canister for a vehicle comprising:

an introduction port for an evaporated fuel provided in a casing;

an atmospheric air port for the evaporated fuel provided in the casing and in continuous communication with the introduction port; and an adsorbing material layer communicating between said introduction port and said atmospheric air port, wherein a chamber is provided between said atmospheric air port and a surface on a side of said atmospheric air port in the adsorbing material layer, and a leakage preventing adsorbing material layer is arranged within said chamber so that a space layer is formed between said leakage preventing adsorbing material layer and the surface on the atmospheric air port side in said adsorbing material layer and another space layer is formed between said leakage preventing adsorbing material layer and said atmospheric air port, and wherein said leakage preventing adsorbing material layer comprises a filter having adsorbent disposed therein.

2. A canister for a vehicle comprising:

an introduction port for an evaporated fuel provided in a casing;

an atmospheric air port for the evaporated fuel provided in the casing and in continuous communication with the introduction port; and an adsorbing material layer communicating between said introduction port and said atmospheric air port, wherein a chamber is provided between said atmospheric air port and a surface on a side of said atmospheric air port in the adsorbing material layer, and at least two leakage preventing adsorbing material layers are arranged within said chamber so that a space layer is formed between said at least two leakage preventing adsorbing material layers and the surface on the atmospheric air port side in said adsorbing material layer, one space layer is formed between the leakage preventing adsorbing material layers, and another space layer is formed between one of said at least two leakage preventing adsorbing material layers and said atmospheric air port, and wherein said at least two leakage preventing adsorbing material layers each comprise as a filter having adsorbent disposed therein.

* * * * *